(12) United States Patent
Nutt et al.

(10) Patent No.: US 6,211,997 B1
(45) Date of Patent: Apr. 3, 2001

(54) MODULATOR FOR OPTICAL PRINTING

(75) Inventors: Alan C. G. Nutt, Rochester; Sujatha Ramanujan, Pittsford; Joseph F. Revelli, Jr., Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/283,068

(22) Filed: Mar. 31, 1999

(51) Int. Cl.⁷ .................................................. G02B 26/00
(52) U.S. Cl. ........................ 359/290; 359/295; 359/245
(58) Field of Search .................................. 259/290, 295, 259/298, 322, 245, 248

(56) References Cited

U.S. PATENT DOCUMENTS

| | | | |
|---|---|---|---|
| 4,281,904 | 8/1981 | Sprague et al. | 359/245 |
| 4,376,568 | 3/1983 | Sprague | 359/245 |
| 4,386,287 | 5/1983 | Karasawa et al. | 310/49 R |
| 4,413,270 | 11/1983 | Sprague | 359/245 |
| 4,591,260 | 5/1986 | Yip | 355/3 R |
| 4,673,953 | 6/1987 | Hecht | 359/245 |
| 4,685,763 | * 8/1987 | Tada et al. | 359/245 |
| 4,786,918 | 11/1988 | Thornton et al. | 346/108 |
| 5,157,541 | * 10/1992 | Schildkraut et al. | 359/245 |
| 5,517,359 | 5/1996 | Gelbart | 359/623 |
| 5,521,748 | 5/1996 | Sarraf | 359/321 |
| 5,748,358 | * 5/1998 | Sugamata et al. | 359/245 |

* cited by examiner

Primary Examiner—Huy Mai
(74) Attorney, Agent, or Firm—Nelson A. Blish

(57) ABSTRACT

A modulator for a high optical power printing includes a transparent crystal and a patterned buffer layer formed over one of the surfaces of the crystal. An electrode array is formed so that each electrode of the electrode array is patterned directly on each portion of the patterned buffer layer. In a further feature of the invention, the crystal substrate can be formed so that opposing endfaces through which high optical power laser light passes are at an angle and are antireflection coated. A transparent and electrically insulating overcoat is provided above the electrodes.

23 Claims, 11 Drawing Sheets

MODULATOR FOR OPTICAL PRINTING

CROSS REFERENCE TO RELATED APPLICATIONS

The present application is related to co-pending U.S. patent application Ser. No 09/283,272 concurrently filed herewith, by Sujatha Ramanujan and Andrew Kurtz entitled LASER PRINTER UTILIZING A SPATIAL LIGHT MODULATOR.

FIELD OF THE INVENTION

The present invention relates to a spatial light modulator which can modulate power in a high optical power laser beam. The spatial light modulator is a total internal reflection spatial light modulator which uses a grating interleaved electrode structure.

BACKGROUND OF THE INVENTION

There are many applications for optical spatial light modulators of high intensity optical beams. Particularly in commercial printing applications, optical laser bars with output power $\geq 20$ W range are not uncommon. If these laser bars are used in a continuous wave mode (CW) as a source of high power light, a means to modulate the high intensity beams of light into a high number of separate pixels is required. Such high power laser bars have wavelengths usually in the 0.8 $\mu$m to 1 $\mu$m range.

U.S. Pat. No. 4,281,904 discloses the use of a total internal reflection (TIR) modulator to modulate a visible He-Ne laser beam. In U.S. Pat. No. 4,281,904, a stop is principally used in the output optics to block the zero order beam and the diffracted first order light is imaged to the media to get modulation contrasts of 100 to 1 for low overall visible light levels. The voltage applied in the arrangement of U.S. Pat. No. 4,281,904 corresponds to the amount of index change necessary in a crystal to diffract incident light into the first order beam efficiently. That diffraction from the fundamental to the first order mode gives a large 20 dB contrast. Unfortunately with this arrangement, light is thrown away (i.e. the un-diffracted percentage and higher orders), and there are nulls (no light refracted) in the optical image. Other patents such as U.S. Pat. No. 4,673,953 use complex schemes to produce 'null free' devices. These complex schemes involve the use of extra optics to remove nulls.

SUMMARY OF THE INVENTION

An object of the present invention is to provide for a total internal reflection modulator which overcomes the drawbacks noted above. The present invention describes the design of a total internal reflection light modulator that can handle extremely high optical powers at infra-red wavelengths such as 0.83 $\mu$m. The device can modulate and pixilate the optical power in such a high optical power laser beam. Within the context of the present description, optical refers to light in the visible, infrared, and near infrared parts of the spectrum. The modulator uses a grating electrode structure protected from the light levels by an optical buffer layer. The light from the modulator is imaged by Schlieren optics combined with a slit or aperture (instead of a stop in the Fourier plane) to obtain a contrast ratio of >4:1 in, for example, 256 pixels. The modulator also does not suffer from the problem of nulls in the output imaged light bar and hence does not need to be null suppressed. Printing media that has a reasonable threshold such as used in the graphic arts area can use such low contrast ratios.

In the present invention, an electrode pitch (i.e. the interleaved electrode grating pitch) that diffracts the light when it total internal reflects from the top surface of the electro-optic crystal was determined from the following constraints:

a) the pitch must be large enough to maintain sufficient electric field depth so as to allow sufficient interaction with the optical field; and b) the pitch must not be so large as to drive the operational voltage (nominally the half wave voltage) above 100 volts.

The pitch was determined by making a test modulator with pitches of 10 $\mu$m and 30 $\mu$m center to center while modifying the duty cycle of the grating structure. The 10 $\mu$m electrode structures never produced much contrast and the 30 $\mu$m patterns had good contrast however they had extremely high operational voltages.

At the same time, a closed form solution of the penetration depth of the electric field inside the electro-optic crystal surface as a function of electrode pitch, electrode width, and applied voltage was undertaken. The results of this investigation was combined with a Finite Element evaluation of the optical interactions within the phase grating to estimate the contrast, interaction length, transmission and reconstruction properties of the electrode induced electro-optic grating structures. The conclusion was that the electrode period should exceed 15 $\mu$m to get high enough optical contrast. Therefore 15 to 20 $\mu$m range is a preferable electrode pitch. The considerations to meet system performance are contained in copending application.

The present invention relates to an internal reflection type spatial light modulator which comprises a crystal substrate; a patterned buffer layer having buffer portions formed on a surface of the crystal substrate; and an electrode array comprising a plurality of electrodes. The electrode array is patterned based on the patterned buffer layer, such that each electrode of the electrode array is positioned on each buffer portion of the patterned buffer layer.

The present invention further relates to an internal reflection type modulator which comprises a crystal substrate having angled opposing end faces; a patterned buffer layer deposited on a surface of the crystal substrate; and an electrode array disposed on the patterned buffer layer.

The present invention further relates to a printer assembly which comprises a light source; and an internal reflection type modulator for modulating light from the light source, with the modulator comprising a crystal substrate and a patterned buffer layer deposited on the crystal substrate. The internal reflection type modulator further comprises electrodes positioned on buffer portions of the patterned buffer layer such that each electrode is positioned on each buffer layer. The printer further comprises an optics assembly for imaging light from the modulator onto a printing plane.

The present invention also relates to a method of modulating a constant wave light beam produced by a high optical power infrared light source. The method comprises the steps of depositing a patterned buffer layer having buffer portions on a surface of a crystal substrate; and positioning an electrode array over the patterned buffer layer, such that each electrode of the electrode array is positioned over a buffer portion of the patterned buffer layer.

BRIEF DESCRIPTION OF THE DRAWINGS

FIG. 2b is an enlarged view of a connector region of the electrode structure of FIG. 2a;

DETAILED DESCRIPTION OF THE INVENTION

Figure 1A:
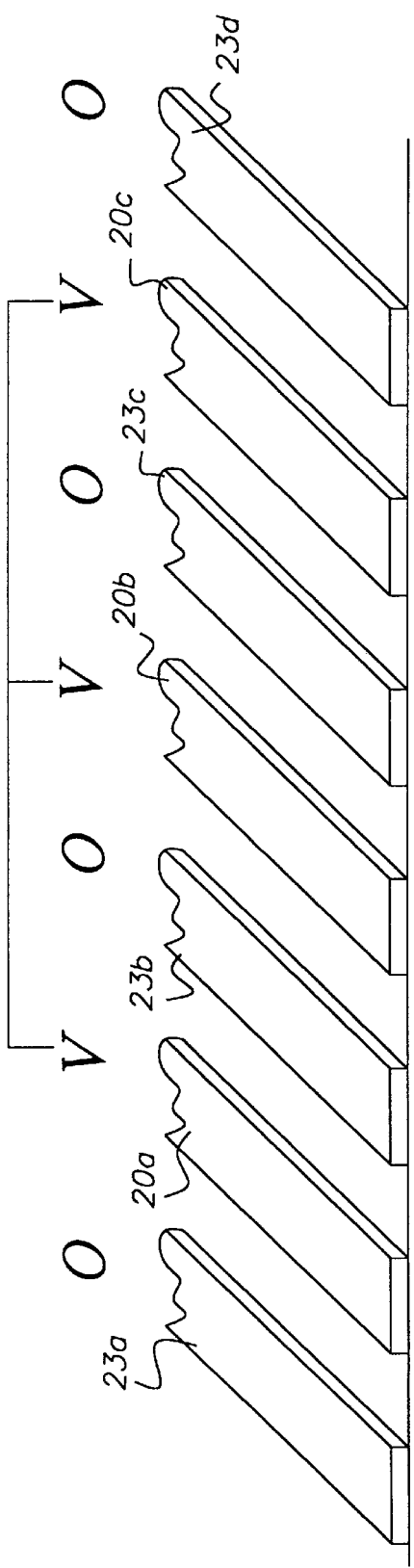
FIG. 1a is a cross-section of an electrode structure in accordance with the present invention.
Figure 1B:
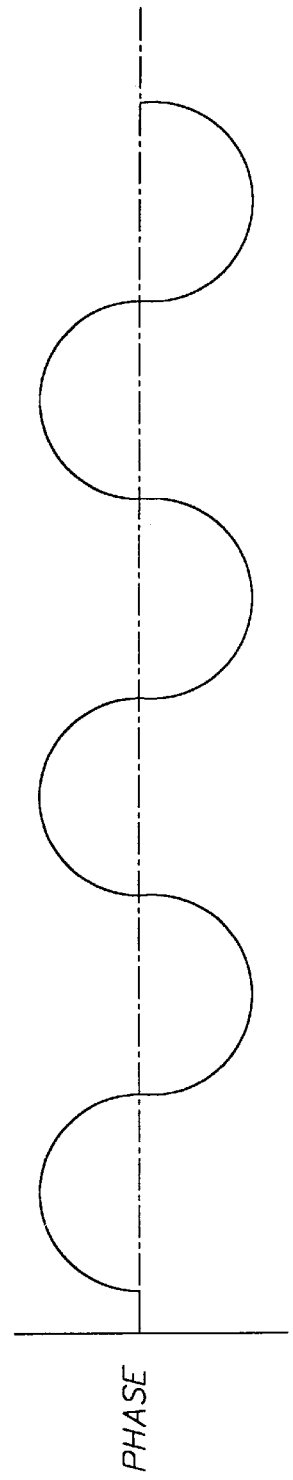
FIG. 1b illustrates a phase shift to a light beam transmitted beneath the electrodes of FIG. 1a that results when the electrodes are energized.

Referring now to the drawings, wherein like reference numerals represent identical or corresponding parts throughout the several views, FIG. 1a illustrates an outline showing one diffraction pixel that is made up of three "hot" electrodes 20a–20c and four ground electrodes 23a–23d. The resultant approximate phase shift that results when the electrodes are energized is shown in FIG. 1b. In order to define pixels within a grating interleaved electrode structure, regions of the grating interleaved electrode structure are attached to one electrical pad. To get adequate diffraction efficiency three full cycles of the electrode pattern are preferred. Therefore the minimum pixel size here is 120 μm, i.e., four ground electrodes encompassing three energized electrodes as in FIG. 1a. Four live and five grounds per pixel (i.e. 160 μm pixels) would also be usable except that it would push the width of the crystal from 30.72 mm to 40.98 mm for a 256 pixel modulator. This is a large increase in the electro-optic crystal real estate used and would require larger optics with a larger field.

One of the designs as mentioned before had 256 pixels and was therefore (256×120 μm) 30.72 mm wide. The electro-optical material used in this case was lithium niobate. To make an electrical connection to such a large electrode structure (given that connection pads are typically 5 mil wide 5 mil gap) the structure had to be put on a crystal that was 33 mm (normal to the electrode structure) and 38 mm long. This is assuming that the active electrode/grating structure is 5 mm long and the electrode pads are positioned outside the width of the 3–5 mm long electrode. The crystal is aligned so that the electrical field from the electrodes is applied principally along the crystal axis with the largest electro-optic effect. In typical electro-optical crystals such as lithium niobate and lithium tantalate, that axis is the C-axis or Z-axis, therefore any crystal orientation can be used as long as the propagation axis is not the Z-axis, and as long as electodes can be applied to the crystal surface to make use of the C-axis electro-optic effect. Because the optical beam interacts with the applied electic field in a limited region identified as an optical interaction distance, the patterned electrode length can exceed the effective optical interaction distance along a propagation direction. Largely due to the bright field implementation of the TIR modulator, the electrode length need not be tailored to determine the interaction length. Rather, the interaction length can be established as an optical design constraint. Allowing longer electrodes not only eases design and processing, but insures that any interelectrode fringe fields at the ends of the electrodes are substantially displaced from the region of optical interaction.

Figure 2A:
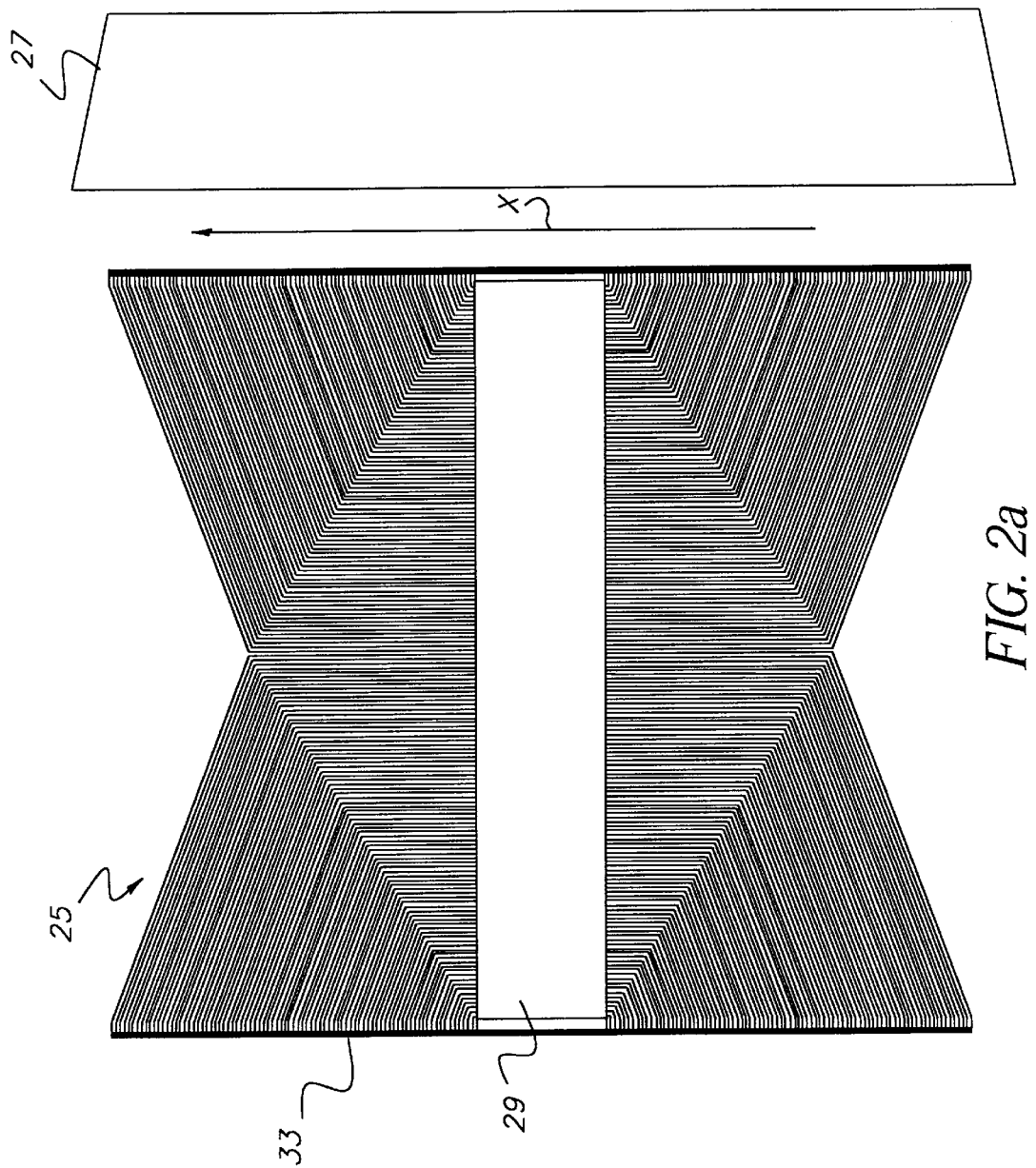
FIG. 2a is an outline of a full 256 active pixel, serpentine ground electrode structure with a side view of an optical crystal.
Figure 2B:
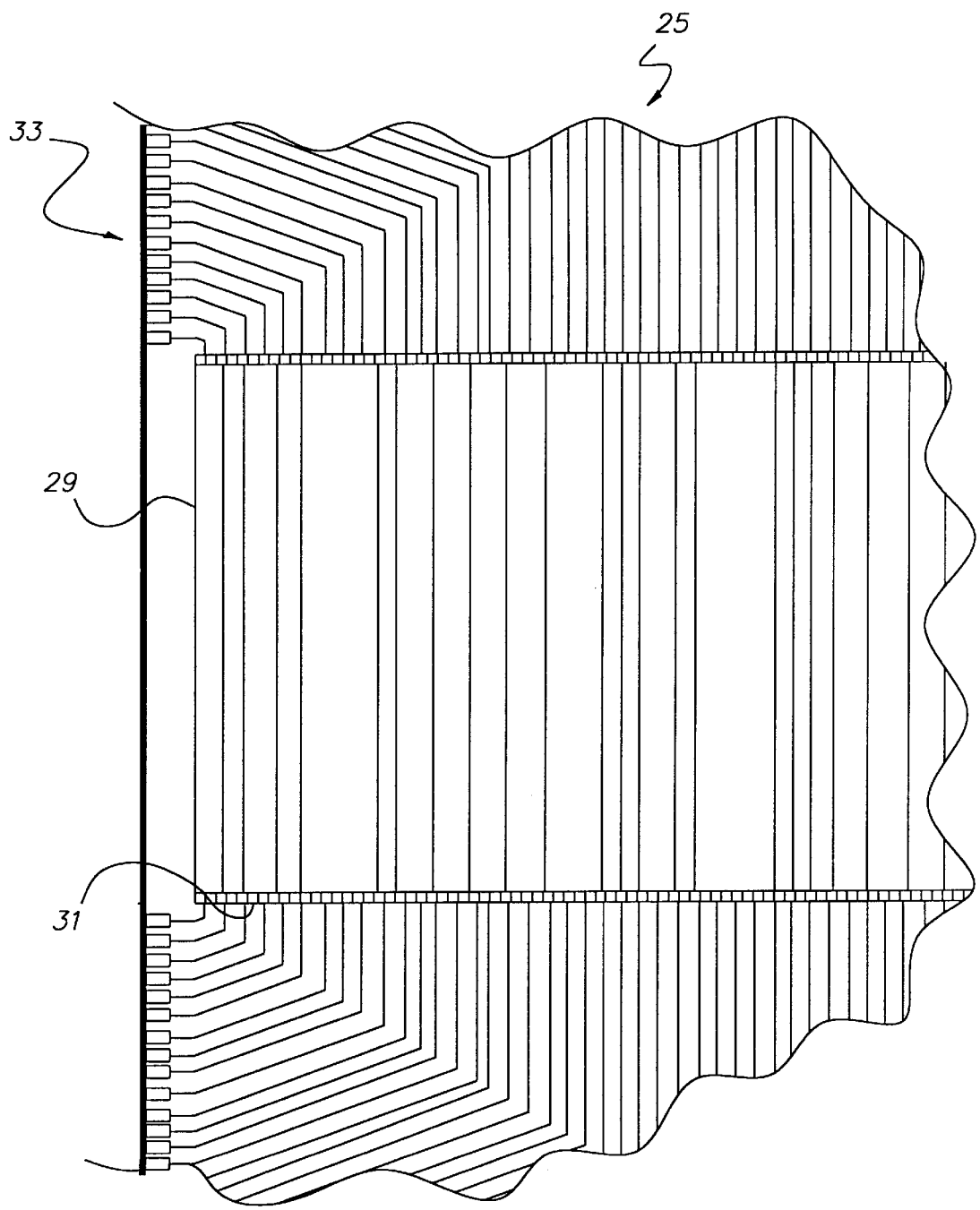
Figure 2C:
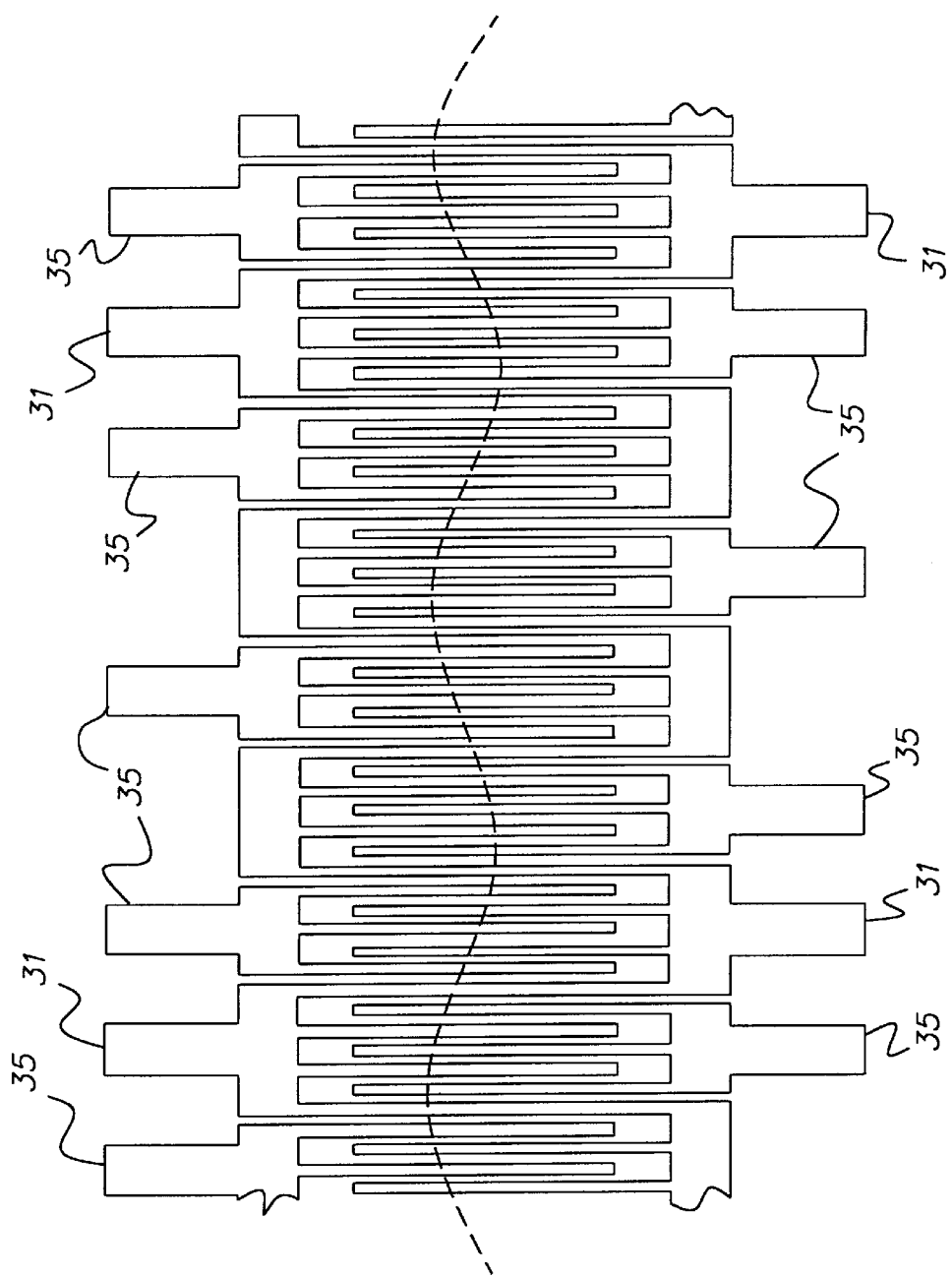
FIG. 2c is an isolated view showing live leads and a ground connection of FIG. 2b.

The electrode structure can be seen in detail in FIGS. 2a, 2b and 2c. FIG. 2a illustrates an outline of a full 256 active pixel, serpentine ground electrode structure 25 with a side view of an optical crystal 27. Electrode structure 25 further includes a grating interleaved electrode region 29. FIG. 2b shows a blow-up of region 29 of FIG. 2b. As illustrated in FIG. 2b, ground 31 is accessed approximately every two to four pixels to ensure continuity. Each of the 256 pixels is individually addressed while the meandering ground connection is continues with connections from the ground electrodes 31 going out to a central ground bus bar 33 as can be seen in FIGS. 2a and 2b. The many connections to the bus bar 33 ensures that the ground is continuous along the full electrode length. FIG. 2c shows the detail of the grating structure shown in FIG. 1 and further illustrates a method of connecting one pixel to three grating "hot" leads 35 and ground connection 31. The grating structure of FIG. 2c includes a curved line in its center to illustrate that the structure is larger than that shown in the figure. The activated pixel width, profile and location is determined by the fixed position of ground elements. While this approach inhibits rastering of pixel position, when used with a multimode source, inter-pixel nulls are rarely present. Thus, the need for rastering addressing is eliminated.

Figure 3A:
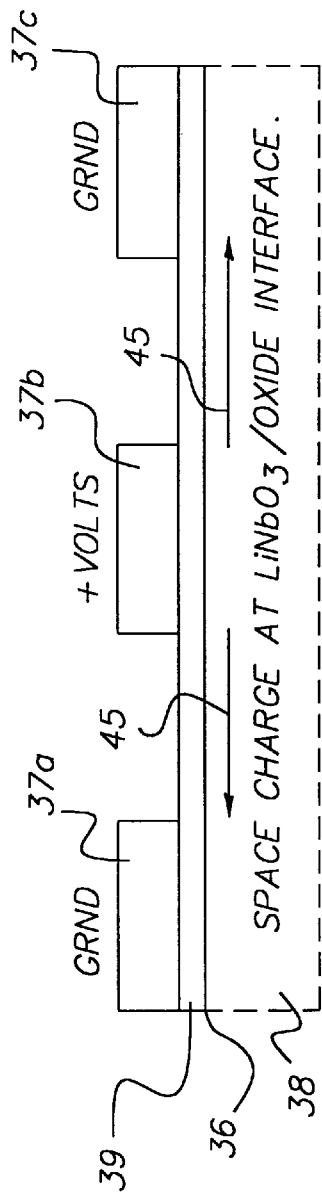
FIG. 3a illustrates a conventional electrode and buffer arrangement.
Figure 3B:
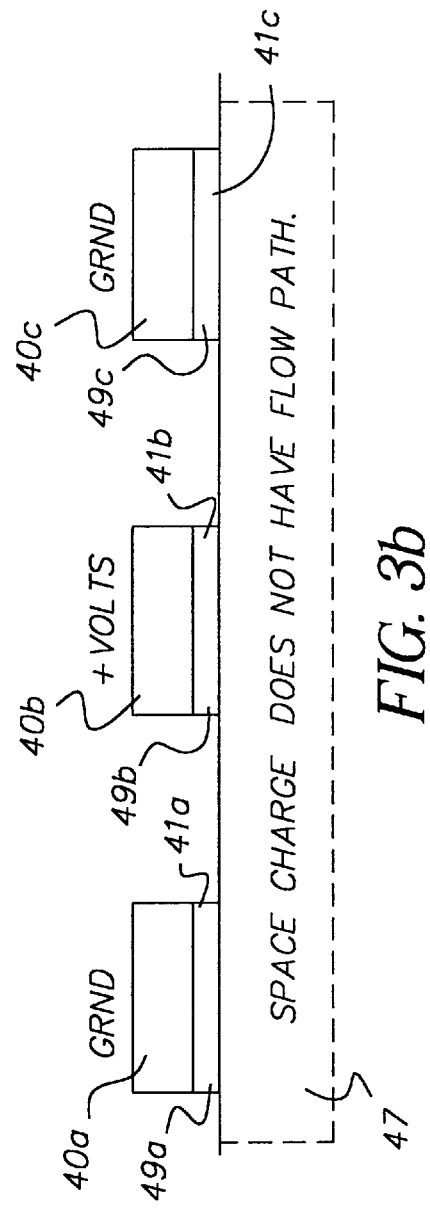
FIG. 3b illustrates an electrode and buffer arrangement in accordance with the present invention.
Figure 3C:
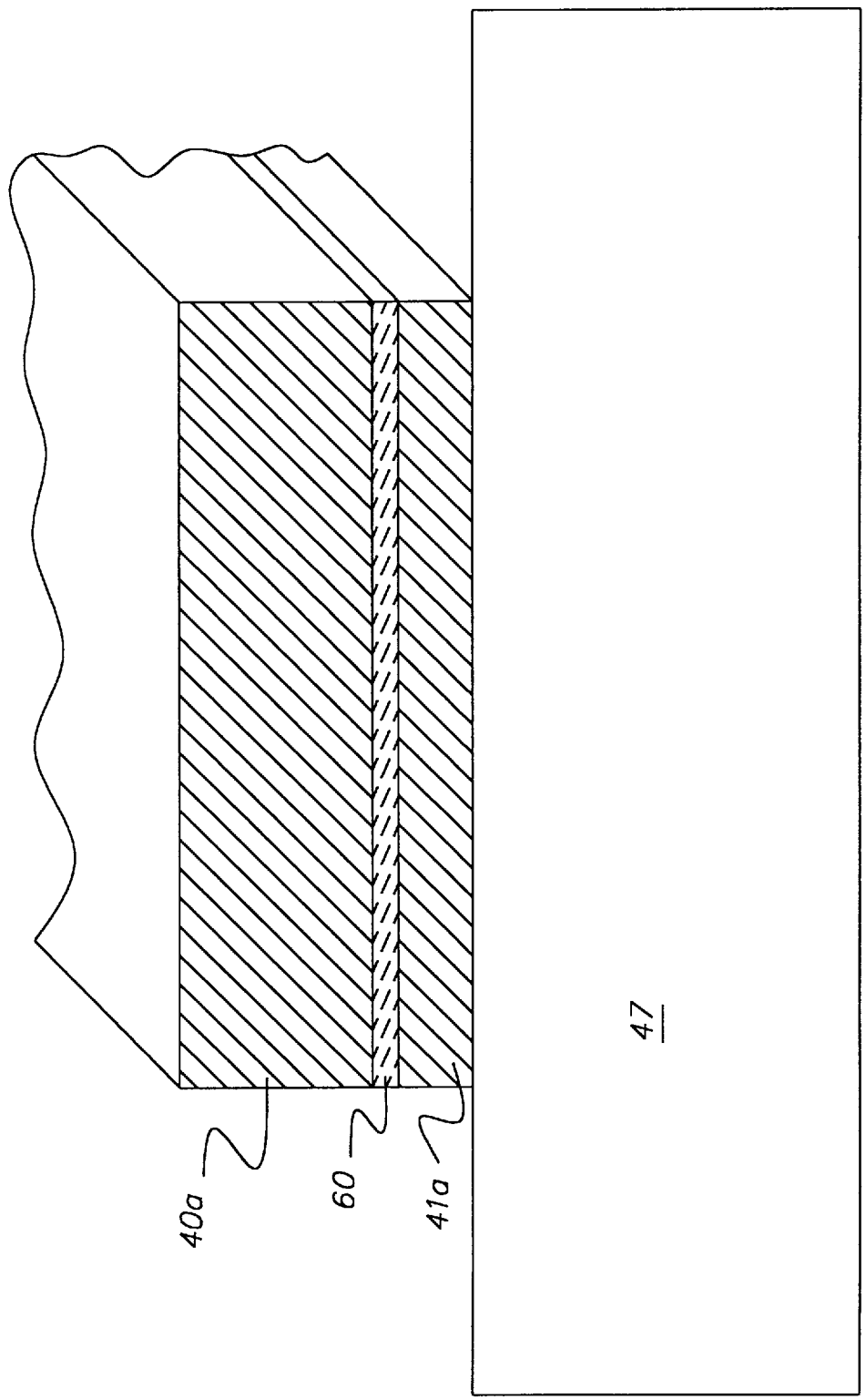
FIG. 3c is an isolated view of one electrode and buffer portion in accordance with the present invention.

FIG. 3a shows a conventional continuous ground grating electrode structure in which electrodes 37a, 37b, 37c are mounted on a continuous buffer layer 39 deposited on an electro-optic crystal 38. One of the problems that some electro-optic crystals such as lithium niobate has is drift caused by charge trapping under an electrode buffer/crystal interface 36 (as an example, it could be made from deposited $SiO_2$) (see FIG. 3a). In the present invention, this has been overcome by fabricating an electrode structure with a deposited buffer material only directly under the electrode structure as shown in the discontinuous buffer structure of FIG. 3b. More specifically, as shown in FIG. 3a, charge 45 migrates along buffer/crystal interface 36 which is continuous. In the invention as shown in FIG. 3b, a buffer layer is deposited on crystal substrate 47 in the form of a pattern so that buffer portions 41a, 41b, 41c are formed. An electrode array patterned so as to include electrodes 40a, 40b, 40c is positioned on the patterned buffer layer such that electrode 40a is positioned on buffer portion 41a, electrode 40b is positioned on buffer portion 41b, electrode 40c is positioned on buffer portion 41c, etc. It is noted that FIG. 3b only shows a section of the structure and that the electrodes and buffer portions of the remaining structure would be positioned as shown in FIG. 3b. With the structure of FIG. 3b, the charge cannot migrate along buffer/crystal interface 49 since interface 49 is not continuous. Also, in the structure of FIG. 3b, charge occurs at buffer crystal interface 49a, 49b, 49c, and not at the overlay crystal interface. Therefore, the charge cannot travel to oppositely charged electrodes and offset the applied voltage. FIG. 3c is a detailed view of a single electrode 40*a* mounted on buffer portion 41*a* deposited on crystal substrate 47. In an embodiment of the present invention, electrode 40*a* can be 0.5 mm thick and an adhesion layer 60 can be positioned between buffer portion 41*a* and electrode 40*a* as shown in FIG. 3*c*.

Figure 4:
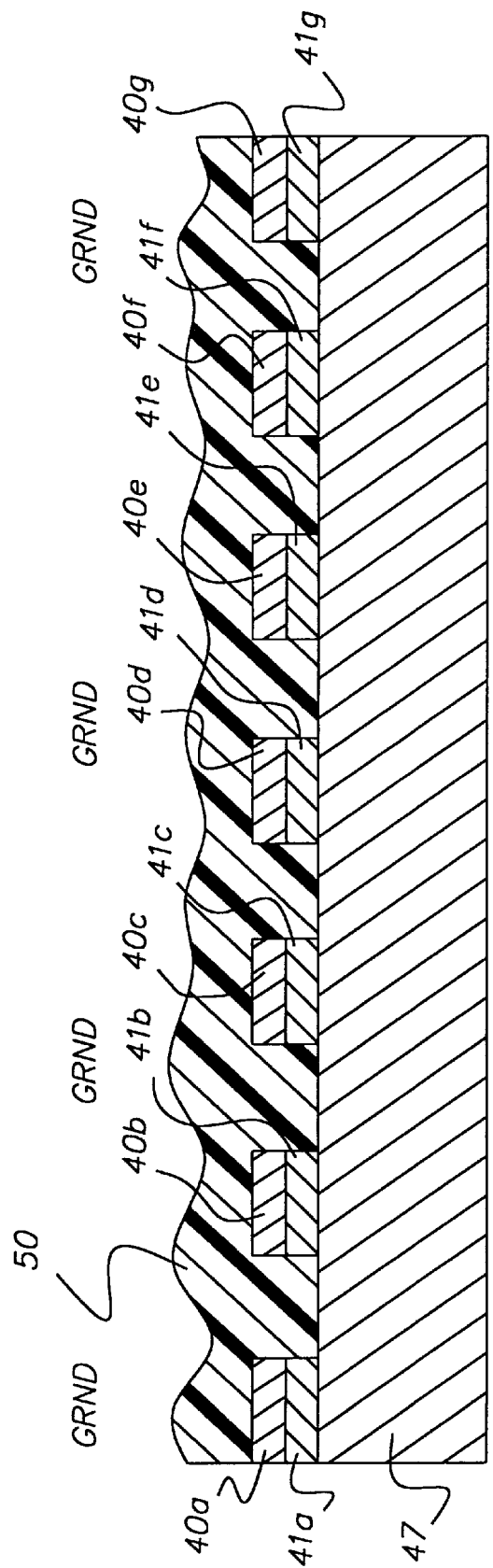
FIG. 4 is a further view of the electrode, buffer and crystal substrate arrangement of the present invention including an electrically insulating overcoat.

In a further feature of the present invention, it is noted that there are extremely high electric fields between electrodes and therefore there should be a material coated over the electrode structure to prevent electric field breakdown that would otherwise occur in air. This surface coating is illustrated in FIG. 4. More specifically, FIG. 4 shows a cross section of the electrode structure including electrodes 40*a*–40*g*, buffer portions 41*a*–41*g* and crystal substrate 47. An overcoat 50 such as an acrylic-type overcoat can be applied to prevent electrical break down in air. Overcoat 50 can be transparent and optically clear. It is noted that overcoat 50 is not limited to an acrylic-type overcoat. Overcoat 50 can also be made of a standard coating material which is used in the electronics area as long as it is non-absorbing, of relatively low index (<<2.2) and is electrically insulating. Further, the present invention is not limited to utilizing an overcoat for preventing electric field breakdown in air. As a further option, an air evacuation method could be utilized to prevent electric field breakdown.

The voltage used to modulate the intensity of the light from a maximum to a minimum is not necessarily a $\pi$ (pi) phase shift as is the case with the modulator configuration disclosed in U.S. Pat. No. 4,281,904, where the diffracted light is designed to be put in the first order diffraction peak and used in a stop spatial filter configuration. Rather it is to the advantage of the user to use a voltage that pertains to a higher order (greater than the first order) of the Bessel function that governs the diffraction of a sinusoidal phase grating. In the present invention, a slit or aperture is used and by diffracting the light into the higher order, light is removed from the zero order. It is mostly the zero order that is imaged to the media. While the selected order may not always provide the greatest diffraction efficiency out of the zero order, the collection efficiency can be optimized. This greatly simplifies the slit or aperture spatial filter construction in the full printing system. Since the diffracted light is not used, having the light in higher diffraction orders does not increase the size, complexity or cost of the input and output optics. A slit or aperture is extremely useful because the printing applications require high optical power levels at the media and cannot afford to throw away optical power as with the stop spatial filter configuration.

Figure 5:
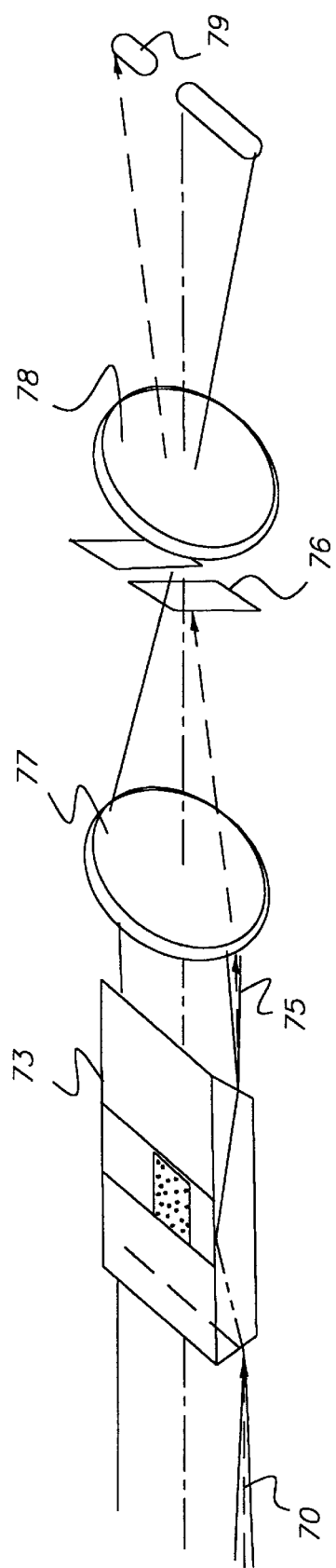
FIG. 5 is a schematic illustration of the modulator of the present invention within a printing assembly.

FIG. 5 is a schematic illustration of an example of a printer assembly and resultant light path which can be achieved with the modulator of the present invention. As illustrated in FIG. 5, laser light from a light source such as a high optical power laser diode is shaped and enters in the form of a laser line illumination 70 into modulator 73. Modulator 73 has an electrode and buffer structure as previously described. After passing through modulator 73, laser light 75 will enter Fourier lens 77 and pass through slit 76. An imaging lens 78 images the laser light onto a printing plane 79.

Figure 6:
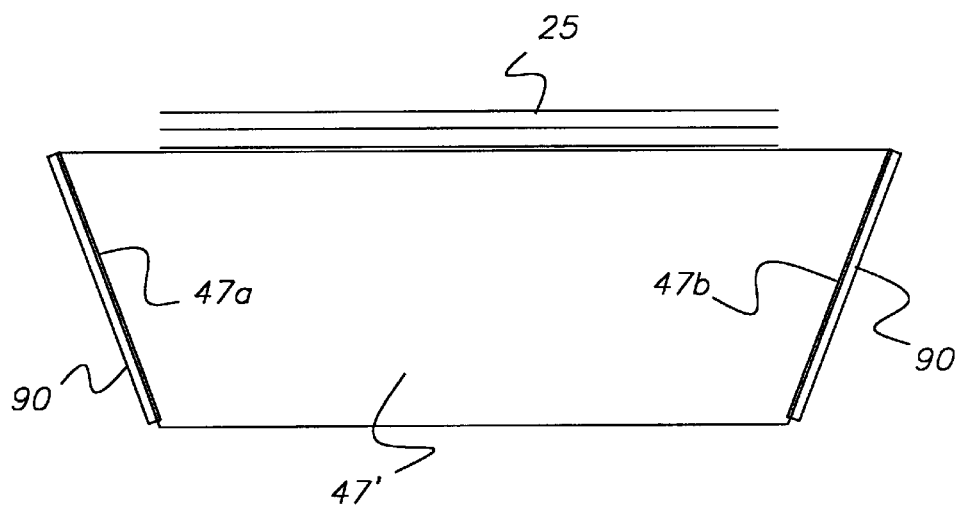
FIG. 6 is side view of a crystal substrate in accordance with the present invention.
Figure 7:
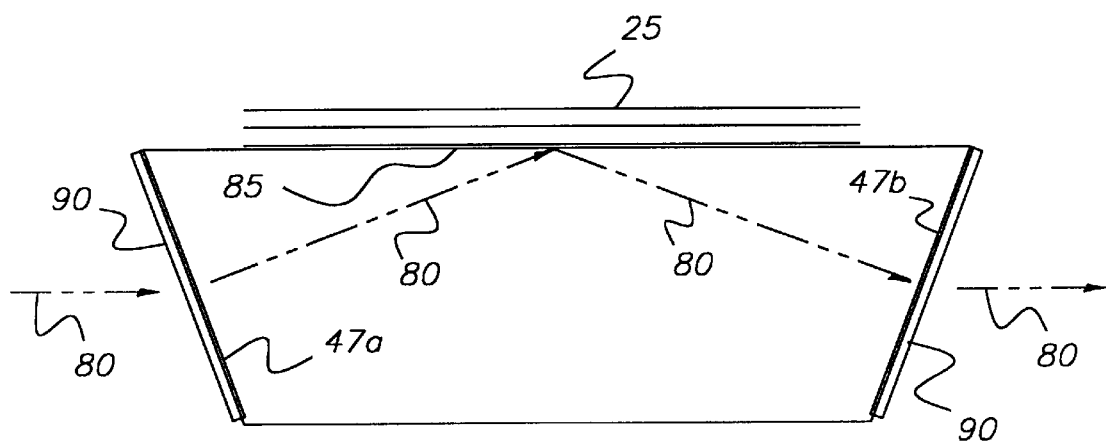
FIG. 7 is a further side view of the crystal substrate of the present invention.

FIGS. 6 and 7 illustrate further features of the present invention with respect to the crystal substrate. Since the modulator of the present invention modulates extremely high optical power, light beam reflections become an issue. In a further feature of the present invention, opposing end faces 47*a*, 47*b* of optical crystal 47' through which the optical beam travels are tilted at an angle of approximately 7 degrees (which is a function of the refractive index that the light encounters as it enters and exits the electro-optical crystal as well as the wavelength of light used) so that the refracted beam is directed to the grating interleaved electrode region 25 (FIG. 6); such that light 80 (FIG. 7) can travel into crystal substrate 47' on a straight through path, keeping parallel and co-incident with the output beam. While within the crystal the light is total internally reflecting from an electro-optic crystal surface 85 where the electrodes are positioned. Since crystal 47' is typically a high index material such as lithium niobate, reflections from each optical surface can be a sizable percentage of the optical power. It is also necessary to use anti-reflection coatings 90 in a single layer or multi layer format on end faces 47*a* and 47*b* to achieve a good laser beam throughput efficiency. Using even a single 140 nm layer of silicon dioxide as an anti-reflection coating on endfaces 47*a*, 47*b* can change the reflections from each interface from 14% down to a few percent. Multilayer anti-reflection coatings have the capability to reduce this percentage much lower, thus allowing the device to have high optical throughput and ensuring that stray high intensity light reflections do not damage the crystal or electrode structure.

Figure 8A:
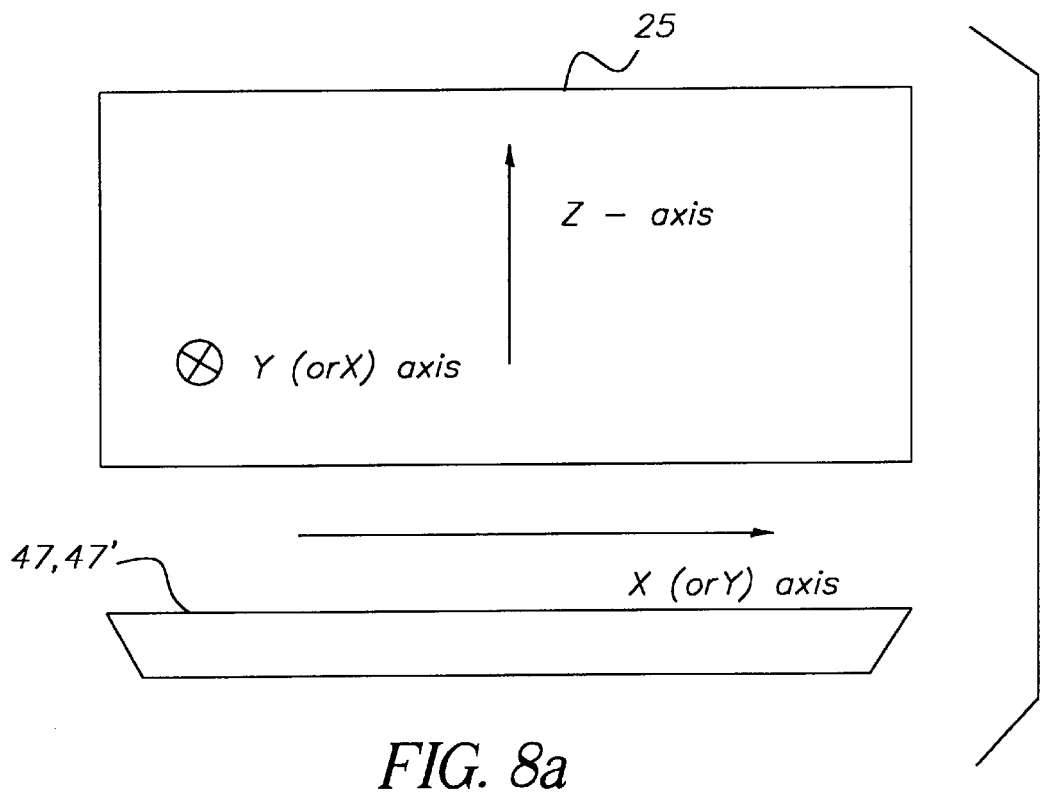
FIGS. 8a and 8b schematically illustrate the X, Y and Z axes of the crystal substrate.
Figure 8B:
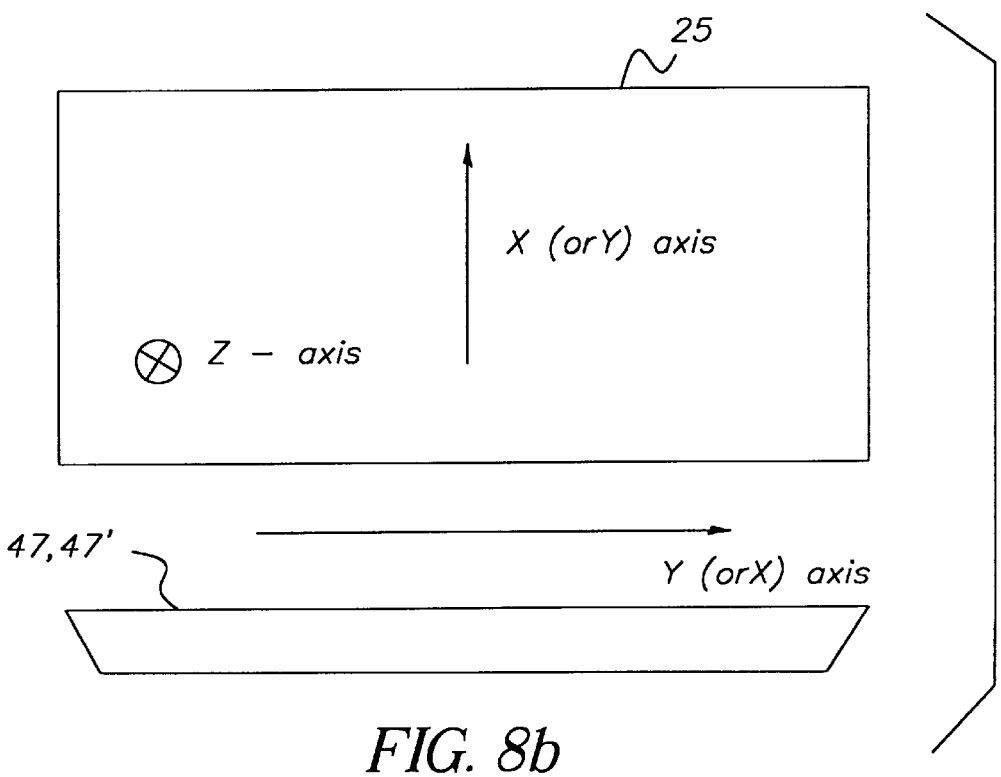

Therefore, the present invention provides for an electro-optic total internal reflection type modulator that modulates a continuous wave light beam produced by a high optical output power infrared (IR) light source. In the present invention, crystal (47, 47') which can be transparent in the visible and IR wavelengths includes X, Y and Z axes which can be configured as illustrated in FIGS. 8*a* and 8*b*; and is formed of an electro-optical material at IR wave lengths (including 0.8 $\mu$m–1 $\mu$m). FIG. 8*a* represents the preferred embodiment in which the polarization of the input light is within the plane of the crystal and parallel to the Z axis, while FIG. 8*b* represents an alternate embodiment if the light polarization is perpendicular to the crystal surface. The modulator includes a patterned buffer layer that has buffer portions provided over one of the surfaces of the crystal and formed of an organic material selected to be electrically insulating, non-absorbing and have a lower refractive index than the crystal substrate at the wavelength of interest. The modulator further includes an electrode array that is formed so that the electrode is patterned only directly on each portion of the patterned buffer layer. That thickness of the buffer is chosen to minimize the effect of evanescent waves for the IR light within the crystal and interacting with the electrodes. That is, the thickness of the buffer is carefully chosen to minimize the absorption of evanescent waves, upon internal reflection, into the electrodes so that ablation damage to the electrodes does not occur. The electrode pattern is aligned to the crystal axis such that the largest electrode-optic effect or tensor can be utilized. This is the electro-optic coefficient $r_{33}$ in standard electro-optic crystals such a lithium niobate.

In the present invention, an interleaved electrode grating with a periodic width of 10 $\mu$m and periodic spacing of 10 $\mu$m and 3 grating periods make up one 120 $\mu$m pixel designed such that the contrast of the modulated beam is better than 4 to 1. The electrode period with a duty cycle can be but is not limited to 50%.

In a further feature of the present invention, the grating period can be between 10 $\mu$m and 30 $\mu$m, and a voltage, typically less than 100V is applied in order to scatter unwanted light out of the system slit.

Figure 9:
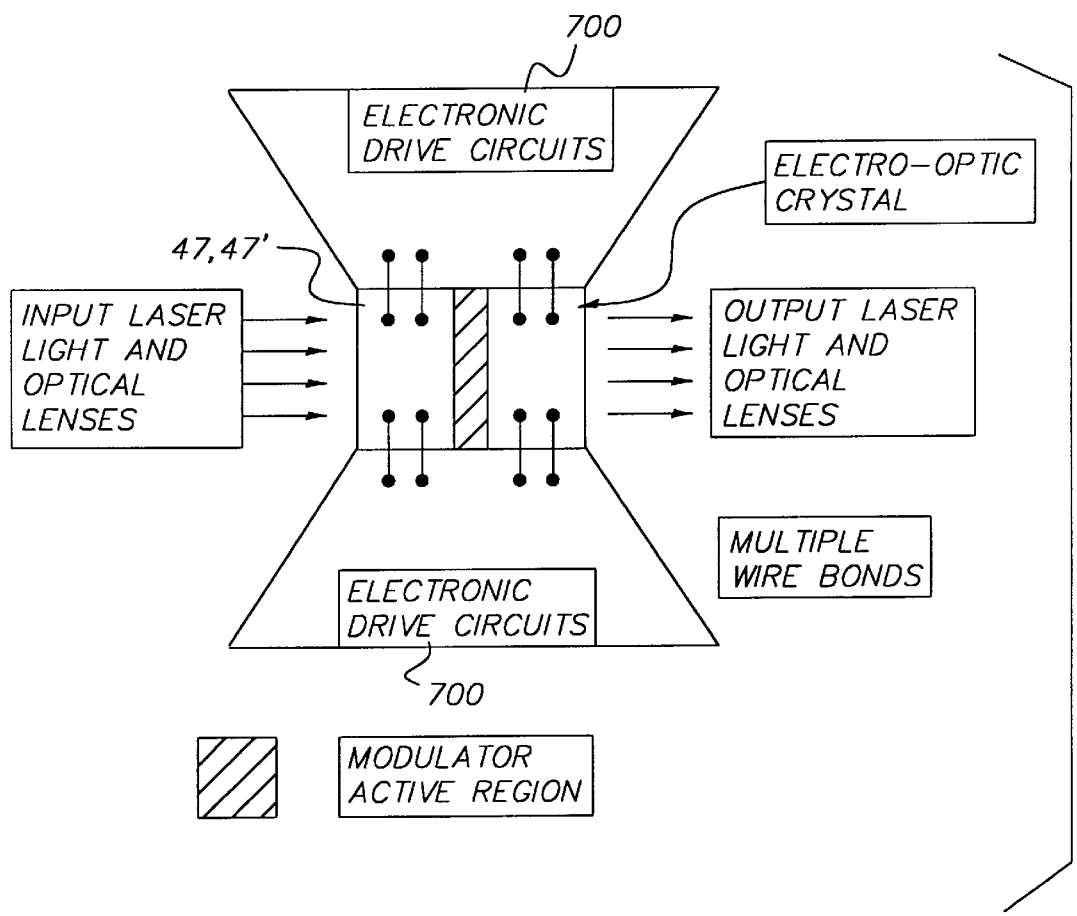
FIG. 9 illustrates the location of electronic drive circuits for the crystal substrate.

A further feature of the present invention includes a means for applying voltages as shown in FIG. 9 to various electrodes of the electrode pattern array to create electric fields in the crystal that alter sections of the light beam passing underneath the electro-structure and within the optically transparent crystal through the electro-optical effect, by modulating these voltages. The means for applying voltages can be in the form of electric drive circuits 700.

An overcoat layer as described above can be an optically clear (including IR wavelengths) and electrically insulating overcoat layer and can be provided over the electrodes and patterned clear portions in between.

The crystal substrate can be formed so that the opposing surfaces through which high optical power laser light passes are tilted or formed at angles, such that the high optical power light which enters the crystal is refracted so that it engages the crystal surface under the electrodes and is total internally reflected by the crystal surface. The light beam is then refracted to pass out of the crystal so that the high optical power output zero order light beam is parallel and concurrent with the light beam entering the crystal.

The beveled or angled high powered light input and output facets or endfaces of the crystal substrate are coated with an anti-reflecting coating or coatings such that the unwanted light reflecting off the input and output faces is minimized.

The modulator of the present invention can have 256 pixels which are connected such that normally 128 pixel pads are on each edge of the crystal which are parallel to the optical beam. A ground connection which meanders in a serpentine fashion around each pixel has numerous connections to a common bus bar on each side of the crystal parallel to the direction of light propagation. Alternately, a separate ground connection to each pixel can be realized.

In a further feature of the present invention, the amount of light deposited by each pixel at the media plane, can be controlled, and therefore balanced, by adjusting the pulse width of the voltage applied to each individual pixel during a line printing time. There would need to be a calibration of the pixels before printing, in order to determine the pulse width for each pixel. In this way, a more uniform printing by the entire array of pixels would result. This provides a means to correct for reasonable non-uniformities in the illuminations, the electrodes, the coatings and the crystal.

The invention has been described in detail with particular reference to certain preferred embodiments thereof, but it will be understood that variations and modifications can be effected within the spirit and scope of the invention.

What is claimed is:

1. An internal reflection type spatial modulator comprising:
   a crystal substrate;
   a patterned buffer layer having buffer portions formed on a support surface of said crystal substrate;
   an electrode array comprising a plurality of electrodes, said electrode array being patterned based on said patterned buffer layer, such that each electrode of said electrode array is positioned on each buffer portion of said patterned buffer layer; and
   wherein said crystal substrate is an electro-optical material.

2. A modulator according to claim 1, wherein said modulator modulates a constant wave light beam produced by a high optical power infrared light source.

3. A modulator according to claim 1, wherein said crystal substrate is transparent in visible and IR wavelengths and includes X, Y and Z axes.

4. A modulator according to claim 3, wherein said electrode array is aligned with the axes of said crystal substrate.

5. A modulator according to claim 1, wherein the buffer portions of said patterned buffer layer are formed of an inorganic material which is electrically insulating, non-absorbing and has a refractive index which is lower than a refractive index of said crystal substrate.

6. A modulator according to claim 1, wherein the buffer portions of said patterned buffer layer each have a thickness which minimizes an interaction between light waves from an infrared light source within the crystal substrate and said electrodes of said electrode array.

7. A modulator according to claim 1, wherein a spacing between each electrode of said electrode array is approximately in a range of 10 microns to 30 microns with a duty cycle of approximately 50%.

8. A modulator according to claim 1, further comprising an optically clear and electrically insulating overcoat layer provided over the electrodes of said electrode array.

9. A modulator according to claim 1, wherein a pulse width of a voltage applied to each pixel of said electrode array is adjustable to balance light levels during printing.

10. A modulator according to claim 1, wherein said crystal substrate comprises opposing surfaces through which a light beam from a light source passes, said opposing surfaces being angled such that the light beam which enters the crystal substrate through one of said opposing surfaces is refracted by said one of said opposing surfaces to engage a lower portion of the support surface of the crystal substrate under the electrode array, said light beam thereafter being totally internally reflected by the lower portion of the support surface of the crystal substrate and exiting said crystal substrate through the other opposing surface of said opposing surfaces, such that the light beam which enters said crystal substrate is concurrent with the light beam which exits said crystal substrate.

11. A modulator according to claim 10, wherein each of said first and second opposing surfaces comprise an anti-reflection coating.

12. An internal reflection type modulator comprising:
    a crystal substrate having angled opposing end faces;
    a patterned buffer layer deposited on a surface of said crystal substrate; and
    an electrode array disposed on said patterned buffer layer.

13. A modulator according to claim 12, wherein an anti-reflection coating is provided on each of said opposing end faces.

14. A modulator according to claim 12, wherein an electrically insulating and transparent overcoat is provided over said electrode array.

15. A printer assembly comprising:
    a light source;
    an internal reflection type modulator for modulating light from said light source, said modulator comprising a crystal substrate and a patterned buffer layer deposited on said crystal substrate, said internal reflection type modulator further comprising electrodes positioned on buffer portions of said patterned buffer layer such that each electrode is positioned on each buffer portion; and
    an optics assembly for imaging light from said modulator onto a printing plane.

16. A printer assembly according to claim 15, wherein said crystal substrate comprises angled end faces.

17. A printer assembly according to claim 16, wherein an anti-reflection coating is provided on said end faces.

18. A printer assembly according to claim 15, wherein an optically clear overcoat layer is provided on said electrodes.

19. A method of modulating a constant wave light beam produced by a high optical power infrared light source, the method comprising the steps of:

depositing a patterned buffer layer having buffer portions on a surface of a crystal substrate; and positioning an electrode array over said patterned buffer layer, such that each electrode of said electrode array is positioned over a buffer portion of said patterned buffer layer.

20. A method according to claim 19, comprising the further step of:

depositing an electrically insulating and optically clear overcoat layer over the electrodes of said electrode array.

21. A method according to claim 19, comprising the further step of:

angling opposing end faces of said crystal substrate, said light beam from said light source passing through said opposing end faces.

22. A method according to claim 21, comprising the further step of:

providing an anti-reflection coating on each of said opposing end faces of said crystal substrate.

23. An internal reflection type spatial modulator comprising:

an electro-optic crystal substrate;

a pattern buffer layer having buffer portions formed on a support surface of said crystal substrate;

a plurality of pixels; wherein each of said pixels is comprised of a plurality of electrodes, said electrode array being patterned based on said pattern buffer layer, such that each electrode of said electrode array is positioned on each buffer portion of said buffered layer; and a ground array forming a pattern with said electrode array; wherein individual elements of said ground array associated with an individual pixel are connected in a serpentine fashion with individual ground elements associated with adjacent pixels.

* * * * *